(12) United States Patent
Dec et al.

(10) Patent No.: US 10,374,884 B2
(45) Date of Patent: Aug. 6, 2019

(54) AUTOMATICALLY, DYNAMICALLY GENERATING AUGMENTATION EXTENSIONS FOR NETWORK FEATURE AUTHORIZATION

(71) Applicant: Cisco Technology, Inc., San Jose, CA (US)

(72) Inventors: Wojciech Dec, San Jose, CA (US); Sanjay Agrawal, San Jose, CA (US); Yi Yang, San Jose, CA (US); Ruchir Gupta, San Jose, CA (US); Syed Basheeruddin Ahmed, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 333 days.

(21) Appl. No.: 15/217,573

(22) Filed: Jul. 22, 2016

(65) Prior Publication Data
US 2018/0026834 A1 Jan. 25, 2018

(51) Int. Cl.
*H04L 12/24* (2006.01)

(52) U.S. Cl.
CPC .................... *H04L 41/082* (2013.01)

(58) Field of Classification Search
CPC ....... H04L 41/082; H04L 45/02; H04L 12/14; H04L 12/66; H04L 41/08; H04L 67/16

USPC ........................................................ 709/221
See application file for complete search history.

(56) References Cited

U.S. PATENT DOCUMENTS

| 2012/0289147 | A1* | 11/2012 | Raleigh | H04L 67/2847 455/3.06 |
| 2013/0019282 | A1* | 1/2013 | Rice | H04L 67/16 726/4 |
| 2015/0049631 | A1* | 2/2015 | Heron | H04L 45/02 370/254 |

\* cited by examiner

*Primary Examiner* — Tu T Nguyen
(74) *Attorney, Agent, or Firm* — Polsinelli PC

(57) ABSTRACT

Disclosed are systems, methods, and computer-readable storage media for automatically, dynamically generating feature model augmentation statements for data nodes for a new network feature described in a data modeling language. A software-defined controller, or other network components, can detect the availability of a new network feature defined by a feature model in a data modeling language and process the feature model to create an authorization policy data defining access rules control rules for the new network feature. Based on the authorization policy, the controller or the authorization model generator can generate a set of augmentation statements for one or more data nodes in the feature model of the new network feature and augment the new feature model with the augmentation statements for controlling access to the new network feature.

20 Claims, 9 Drawing Sheets

AUTOMATICALLY, DYNAMICALLY GENERATING AUGMENTATION EXTENSIONS FOR NETWORK FEATURE AUTHORIZATION

TECHNICAL FIELD

This disclosure relates in general to the field of computer networks and, more particularly, pertains to automatically augmenting feature models.

BACKGROUND

In modern computer networks, network features such as software modules, firmware features for new hardware, virtual machines, etc. are routinely added, modified, updated, etc. The operational parameters and the configuration of the network features can be modeled using a variety of modeling techniques, such as the YANG modeling language for the standardized Network Configuration Protocol (NETCONF).

In some modeling languages, once a model is defined, revisions to the model can involve adding new parameters to the model; conversely, removal of parameters is oftentimes not permitted. Such a restriction on the removal of parameters from a feature model is problematic for a variety of reasons. Notably, operators of software-defined network routinely choose to restrict access to certain feature parameters for subsets of users—and the inability to remove parameters from feature models in common modeling languages creates hassles for the operators.

To address the problem created by restricting removal of features from a feature model, organizations can utilize a policy engine that enforces rule-based access control policies. However, constantly monitoring the policy engine to check for every occurrence of changes to a feature model is burdensome. Also, altering the enforcement policies upon detecting a change requires advanced know-how and is time-consuming. Additionally, an organization may not have the expertise to identify and establish appropriate values for the authorization policies; likewise, default values provided in the feature model may not be suitable for the organization.

BRIEF DESCRIPTION OF THE DRAWINGS

In order to describe the manner in which the above-recited features and other advantages of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting its scope, the principles herein are described and explained with additional specificity and detail through the use of the accompanying drawings in which.

DESCRIPTION OF EXAMPLE EMBODIMENTS

Figure 1:
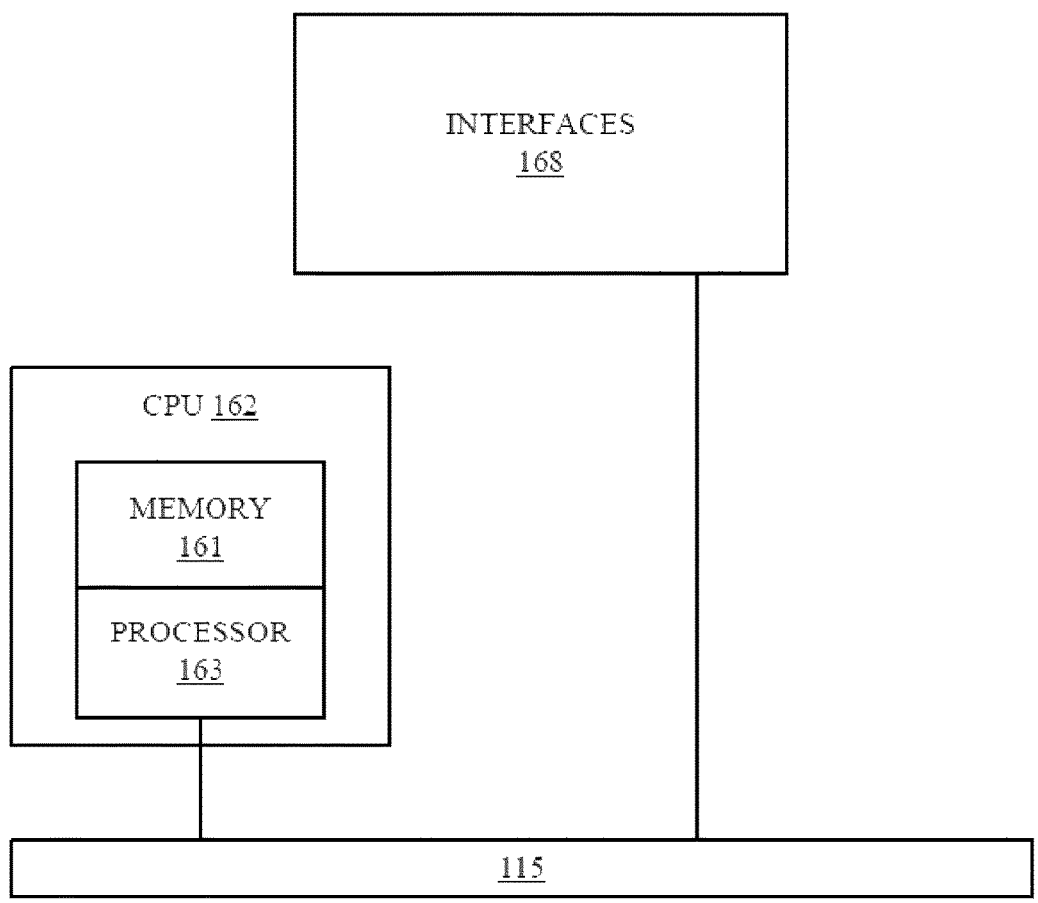
FIG. 1 illustrates an example network device according to some aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview:

Disclosed are systems, methods, and computer-readable storage media for automatically, dynamically generating feature model augmentation statements for data nodes of a new network feature described in a data modeling language. In some cases, a software-defined network controller is connected in a network with an augmentation engine, one or more authorization policy engines, and one or more provider of a new network feature such as a new service, device, firmware for a device, etc. In some cases, the new network feature is defined in a data modeling language, such as a YANG modeling language. In some cases the new network features is one or more of a new software service and a new network device.

The software-defined controller, or other network components, can detect the availability of a new network feature defined by a feature model in a data modeling language and process the feature model to create an authorization policy data defining access rules control rules for the new network feature. Based on the authorization policy, the controller or the authorization model generator can generate a set of augmentation statements for one or more data nodes in the feature model of the new network feature and augment the new feature model with the augmentation statements. After the feature model is augmented, the controller or the authorization model generator can deploy the augmented feature model for the new network feature, such that the augmentation statements in the deployed augmented feature model controls access to the new network feature.

In some cases, the controller or the authorization model generator processes the feature model by applying one or more rules and heuristics to each data node in the feature model. In some cases, the controller or the authorization model generator further correlates the authorization policy with a client profile, a set of collected client data, and/or a collection of business intelligence data. The controller or the authorization model generator can further generate the set of augmentation statements for one or more data nodes in the feature model of the new network feature based on the one or more access control rules generated from the client profile, the collected client data, and the business intelligence.

Examples of dynamic augmentation of a feature model described herein refer specifically to authorization policies, authorization policy engines, authorization model generators, etc. However, the disclosed systems, methods, and computer-readable media for dynamic augmentation of feature models can also be extended to a wide range of network features.

DETAILED DESCRIPTION

Disclosed are systems and methods for automatically, dynamically generating augmentation extensions for network feature authorization. A brief introductory description of exemplary systems and networks, as illustrated in FIGS. 1 through 5, is disclosed herein, followed by a discussion of systems, methods and computer-readable media for automatically, dynamically augmenting feature models. The disclosure now turns to FIG. 1.

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which virtual machines (VMs) communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments; networks; devices; ports; physical or logical links; and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

FIG. 1 illustrates an exemplary network device 110 suitable for implementing the present technology. Network device 110 includes a master central processing unit (CPU) 162, interfaces 168, and a bus 115 (e.g., a PCI bus). When acting under the control of appropriate software or firmware, the CPU 162 is responsible for executing packet management, error detection, and/or routing functions, such policy enforcement, for example. The CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of network device 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the network device 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control, and management. By providing separate processors for the communications intensive tasks, these interfaces allow the master microprocessor 162 to efficiently perform control plane functions, such as routing computations, network diagnostics, security functions, etc.

Although the system shown in FIG. 1 is one specific network device of the present technology, it is by no means the only network device architecture on which the present technology can be implemented. For example, an architecture having a single processor that handles communications as well as routing computations, etc. is often used. Further, other types of interfaces and media could also be used with the network device.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 2A:
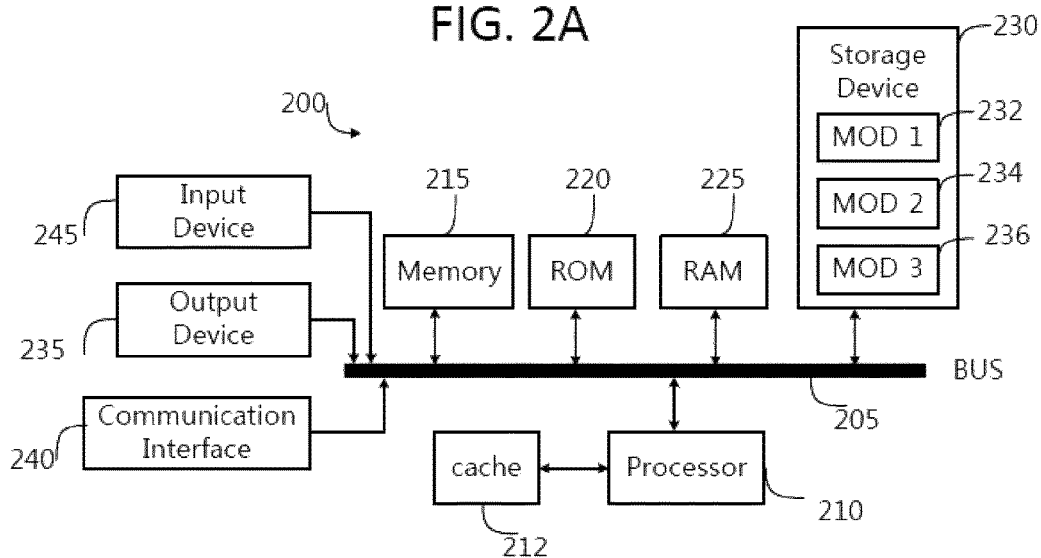
FIGS. 2A and 2B illustrate an example system embodiments according to some aspects of the subject technology.
Figure 2B:
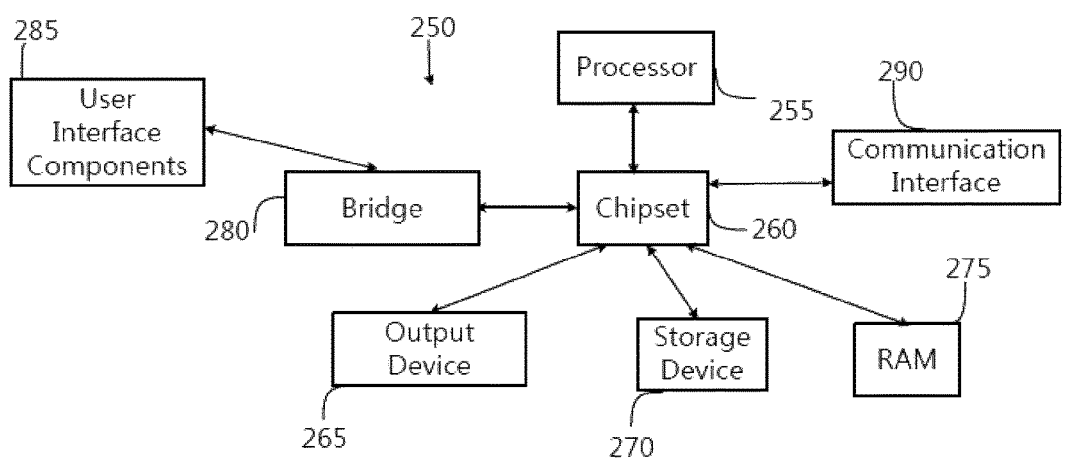

FIG. 2A, and FIG. 2B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, output device 235, and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example.

Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or RAM 275. Further, the machine can receive inputs from a user via user interface components 285 and execute appropriate functions, such as browsing functions by interpreting these inputs using processor 255.

It can be appreciated that exemplary systems 200 and 250 can have more than one processor 210 or be part of a group or cluster of computing devices networked together to provide greater processing capability.

Figure 3:
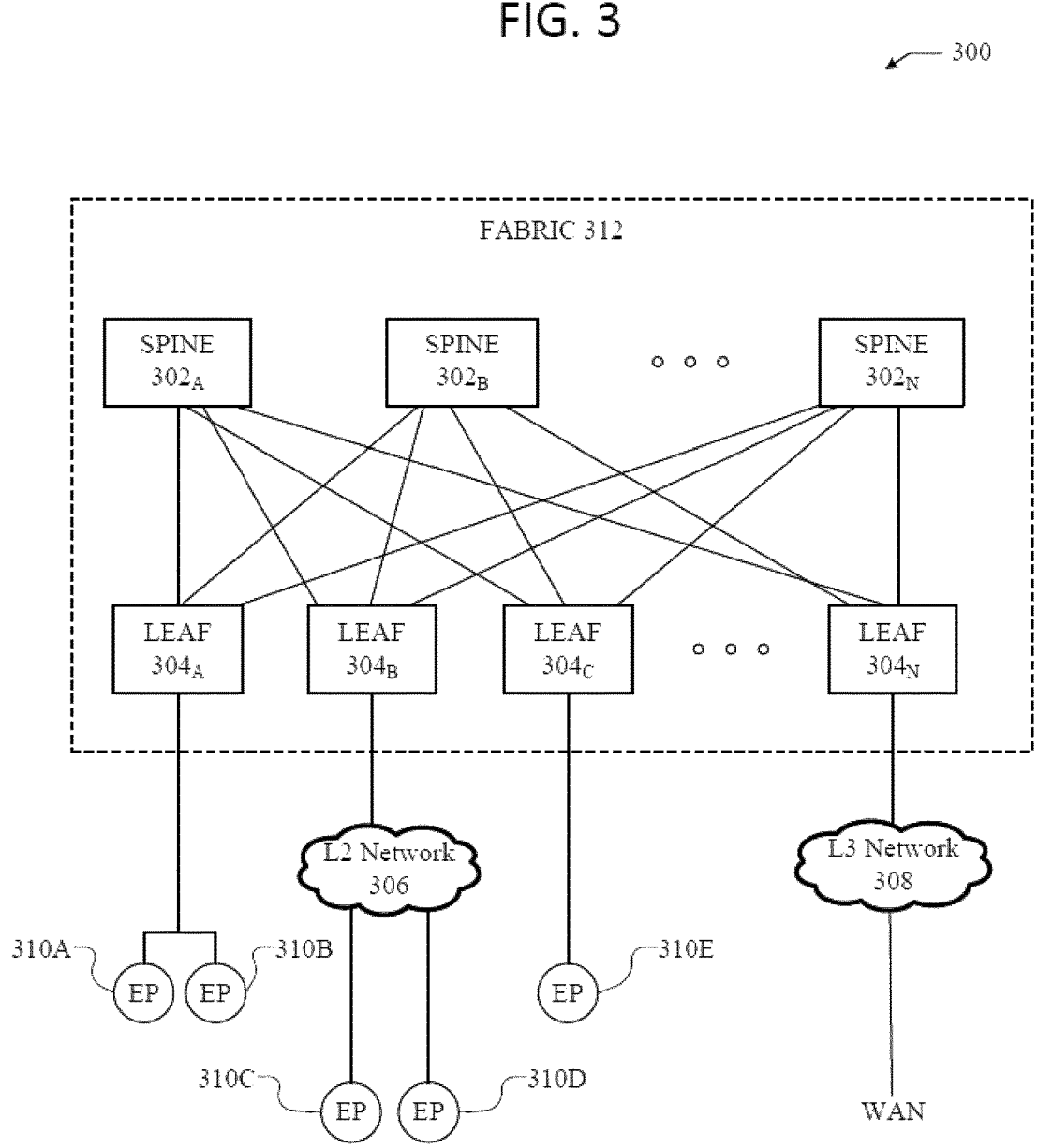
FIG. 3 illustrates a schematic block diagram of an example architecture for a network fabric.

FIG. 3 illustrates a schematic block diagram of an example architecture 300 for a network fabric 312. The network fabric 312 can include spine switches $302_A$, $302_B$, ..., $302_N$ (collectively "302") connected to leaf switches $304_A$, $304_B$, $304_C$ ... $304_N$ (collectively "304") in the network fabric 312.

Spine switches 302 can be L3 switches in the fabric 312. However, in some cases, the spine switches 302 can also, or otherwise, perform L2 functionalities. Further, the spine switches 302 can support various capabilities, such as 40 or 10 Gbps Ethernet speeds. To this end, the spine switches 302 can include one or more 40 Gigabit Ethernet ports. Each port can also be split to support other speeds. For example, a 40 Gigabit Ethernet port can be split into four 10 Gigabit Ethernet ports.

In some embodiments, one or more of the spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated tenant packet to get to the destination locator address of the tenant. The spine switches 302 can then perform a lookup of their local mapping database to determine the correct locator address of the packet and forward the packet to the locator address without changing certain fields in the header of the packet.

When a packet is received at a spine switch $302_i$ the spine switch $302_i$ can first check if the destination locator address is a proxy address. If so, the spine switch $302_i$ can perform the proxy function as previously mentioned. If not, the spine switch $302_i$ can look up the locator in its forwarding table and forward the packet accordingly.

Spine switches 302 connect to leaf switches 304 in the fabric 312. Leaf switches 304 can include access ports (or non-fabric ports) and fabric ports. Fabric ports can provide uplinks to the spine switches 302, while access ports can provide connectivity for devices, hosts, endpoints, VMs, or external networks to the fabric 312.

Leaf switches 304 can reside at the edge of the fabric 312, and can thus represent the physical network edge. In some cases, the leaf switches 304 can be top-of-rack ("ToR") switches configured according to a ToR architecture. In other cases, the leaf switches 304 can be aggregation switches in any particular topology, such as end-of-row (EoR) or middle-of-row (MoR) topologies. The leaf switches 304 can also represent aggregation switches, for example.

The leaf switches 304 can be responsible for routing and/or bridging the data packets and applying network policies. In some cases, a leaf switch can perform one or more additional functions, such as implementing a mapping cache, sending packets to the proxy function when there is a miss in the cache, encapsulating packets, enforcing ingress or egress policies, etc.

Moreover, the leaf switches 304 can contain virtual switching functionalities, such as a virtual tunnel endpoint (VTEP) function as explained below in the discussion of VTEP 408 in FIG. 4. To this end, leaf switches 304 can connect the fabric 312 to an overlay network, such as overlay network 400 illustrated in FIG. 4.

Network connectivity in the fabric 312 can flow through the leaf switches 304. Here, the leaf switches 304 can provide servers, resources, endpoints, external networks, or VMs access to the fabric 312, and can connect the leaf switches 304 to each other. In some cases, the leaf switches 304 can connect EPGs to the fabric 312 and/or any external networks. Each EPG can connect to the fabric 312 via one of the leaf switches 304, for example.

Endpoints 310A-E (collectively "310") can connect to the fabric 312 via leaf switches 304. For example, endpoints 310A and 310B can connect directly to leaf switch 304A, which can connect endpoints 310A and 310B to the fabric 312 and/or any other one of the leaf switches 304. Similarly, endpoint 310E can connect directly to leaf switch 304C, which can connect endpoint 310E to the fabric 312 and/or any other of the leaf switches 304. On the other hand, endpoints 310C and 310D can connect to leaf switch 304B via L2 network 306. Similarly, the wide area network (WAN) can connect to the leaf switches 304C or 304D via L3 network 308.

Endpoints 310 can include any communication device, such as a computer, a server, a switch, a router, etc. In some cases, the endpoints 310 can include a server, hypervisor, or switch configured with a VTEP functionality which connects an overlay network, such as overlay network 400 below, with the fabric 312. For example, in some cases, the endpoints 310 can represent one or more of the VTEPs 408A-D illustrated in FIG. 4. Here, the VTEPs 408A-D can connect to the fabric 312 via the leaf switches 304. The overlay network can host physical devices, such as servers, applications, EPGs, virtual segments, virtual workloads, etc. In addition, the endpoints 310 can host virtual workload(s), clusters, and applications or services, which can connect with the fabric 312 or any other device or network, including an external network. For example, one or more endpoints 310 can host, or connect to, a cluster of load balancers or an EPG of various applications.

Although the fabric 312 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Figure 4:
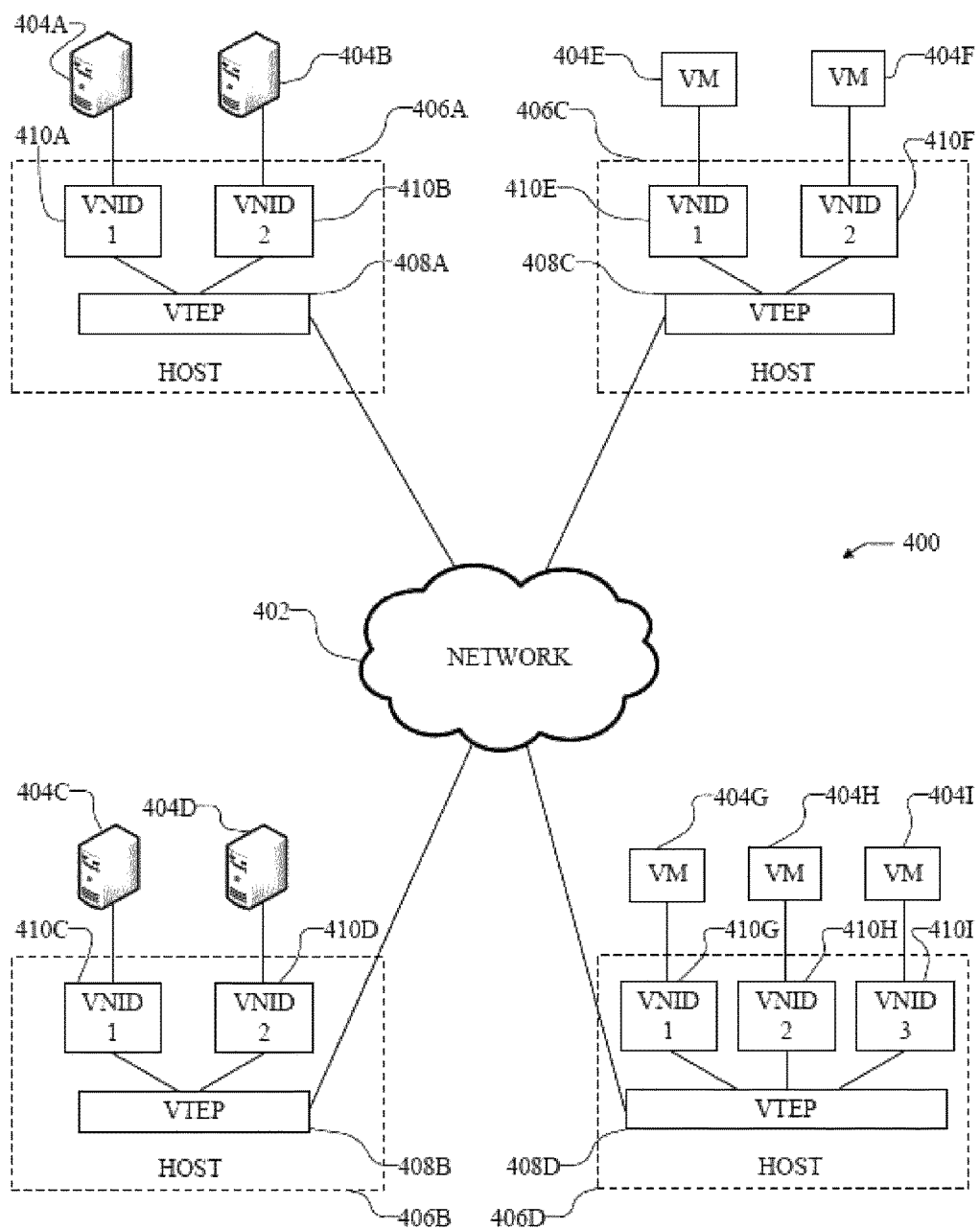
FIG. 4 illustrates an example overlay network.

FIG. 4 illustrates an exemplary overlay network 400. Overlay network 400 uses an overlay protocol, such as VXLAN, VGRE, VO3, or STT, to encapsulate traffic in L2 and/or L3 packets which can cross overlay L3 boundaries in the network. As illustrated in FIG. 4, overlay network 400 can include hosts 406A-D interconnected via network 402.

Network 402 can include a packet network, such as an IP network, for example. Moreover, network 402 can connect the overlay network 400 with the fabric 312 in FIG. 3. For example, VTEPs 408A-D can connect with the leaf switches 304 in the fabric 312 via network 402.

Hosts 406A-D include virtual tunnel end points (VTEP) 408A-D, which can be virtual nodes or switches configured to encapsulate and de-encapsulate data traffic according to a specific overlay protocol of the network 400, for the various virtual network identifiers (VNIDs) 410A-I. Moreover, hosts 406A-D can include servers containing a VTEP functionality, hypervisors, and physical switches, such as L3 switches, configured with a VTEP functionality. For example, hosts 406A and 406B can be physical switches configured to run VTEPs 408A-B. Here, hosts 406A and 406B can be connected to servers 404A-D, which, in some cases, can include virtual workloads through VMs loaded on the servers, for example.

In some embodiments, network 400 can be a VXLAN network, and VTEPs 408A-D can be VXLAN tunnel end points (VTEP). However, as one of ordinary skill in the art will readily recognize, network 400 can represent any type of overlay or software-defined network, such as NVGRE, STT, or even overlay technologies yet to be invented.

The VNIDs can represent the segregated virtual networks in overlay network 400. Each of the overlay tunnels (VTEPs 408A-D) can include one or more VNIDs. For example, VTEP 408A can include VNIDs 1 and 2, VTEP 408B can include VNIDs 1 and 2, VTEP 408C can include VNIDs 1 and 2, and VTEP 408D can include VNIDs 1-3. As one of ordinary skill in the art will readily recognize, any particular VTEP can, in other embodiments, have numerous VNIDs, including more than the 3 VNIDs illustrated in FIG. 4.

The traffic in overlay network 400 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Servers 404A-D and VMs 404E-I can connect to their respective VNID or virtual segment, and communicate with other servers or VMs residing in the same VNID or virtual segment. For example, server 404A can communicate with server 404C and VMs 404E and 404G because they all reside in the same VNID, viz., VNID 1. Similarly, server 404B can communicate with VMs 404F and 404H because they all reside in VNID 2. VMs 404E-I can host virtual workloads, which can include application workloads, resources, and services, for example. However, in some cases, servers 404A-D can similarly host virtual workloads through VMs hosted on the servers 404A-D. Moreover, each of the servers 404A-D and VMs 404E-I can represent a single server or VM, but can also represent multiple servers or VMs, such as a cluster of servers or VMs.

VTEPs 408A-D can encapsulate packets directed at the various VNIDs 1-3 in the overlay network 400 according to the specific overlay protocol implemented, such as VXLAN, so traffic can be properly transmitted to the correct VNID and recipient(s). Moreover, when a switch, router, or other network device receives a packet to be transmitted to a recipient in the overlay network 400, it can analyze a routing table, such as a lookup table, to determine where such packet needs to be transmitted so the traffic reaches the appropriate recipient. For example, if VTEP 408A receives a packet from endpoint 404B that is intended for endpoint 404H, VTEP 408A can analyze a routing table that maps the intended endpoint, endpoint 404H, to a specific switch that is configured to handle communications intended for endpoint 404H. VTEP 408A might not initially know, when it receives the packet from endpoint 404B, that such packet should be transmitted to VTEP 408D in order to reach endpoint 404H. Accordingly, by analyzing the routing table, VTEP 408A can lookup endpoint 404H, which is the intended recipient, and determine that the packet should be transmitted to VTEP 408D, as specified in the routing table based on endpoint-to-switch mappings or bindings, so the packet can be transmitted to, and received by, endpoint 404H as expected.

However, continuing with the previous example, in many instances, VTEP 408A may analyze the routing table and fail to find any bindings or mappings associated with the intended recipient, e.g., endpoint 404H. Here, the routing table may not yet have learned routing information regarding endpoint 404H. In this scenario, the VTEP 408A may likely broadcast or multicast the packet to ensure the proper switch associated with endpoint 404H can receive the packet and further route it to endpoint 404H.

In some cases, the routing table can be dynamically and continuously modified by removing unnecessary or stale entries and adding new or necessary entries, in order to maintain the routing table up-to-date, accurate, and efficient, while reducing or limiting the size of the table.

As one of ordinary skill in the art will readily recognize, the examples and technologies provided above are simply for clarity and explanation purposes, and can include many additional concepts and variations.

Depending on the desired implementation in the network 400, a variety of networking and messaging protocols may be used, including but not limited to TCP/IP, open systems interconnection (OSI), file transfer protocol (FTP), universal plug and play (UpnP), network file system (NFS), common internet file system (CIFS), AppleTalk etc. As would be appreciated by those skilled in the art, the network 400 illustrated in FIG. 4 is used for purposes of explanation, a network system may be implemented with many variations, as appropriate, in the configuration of network platform in accordance with various embodiments of the present disclosure.

Figure 5:
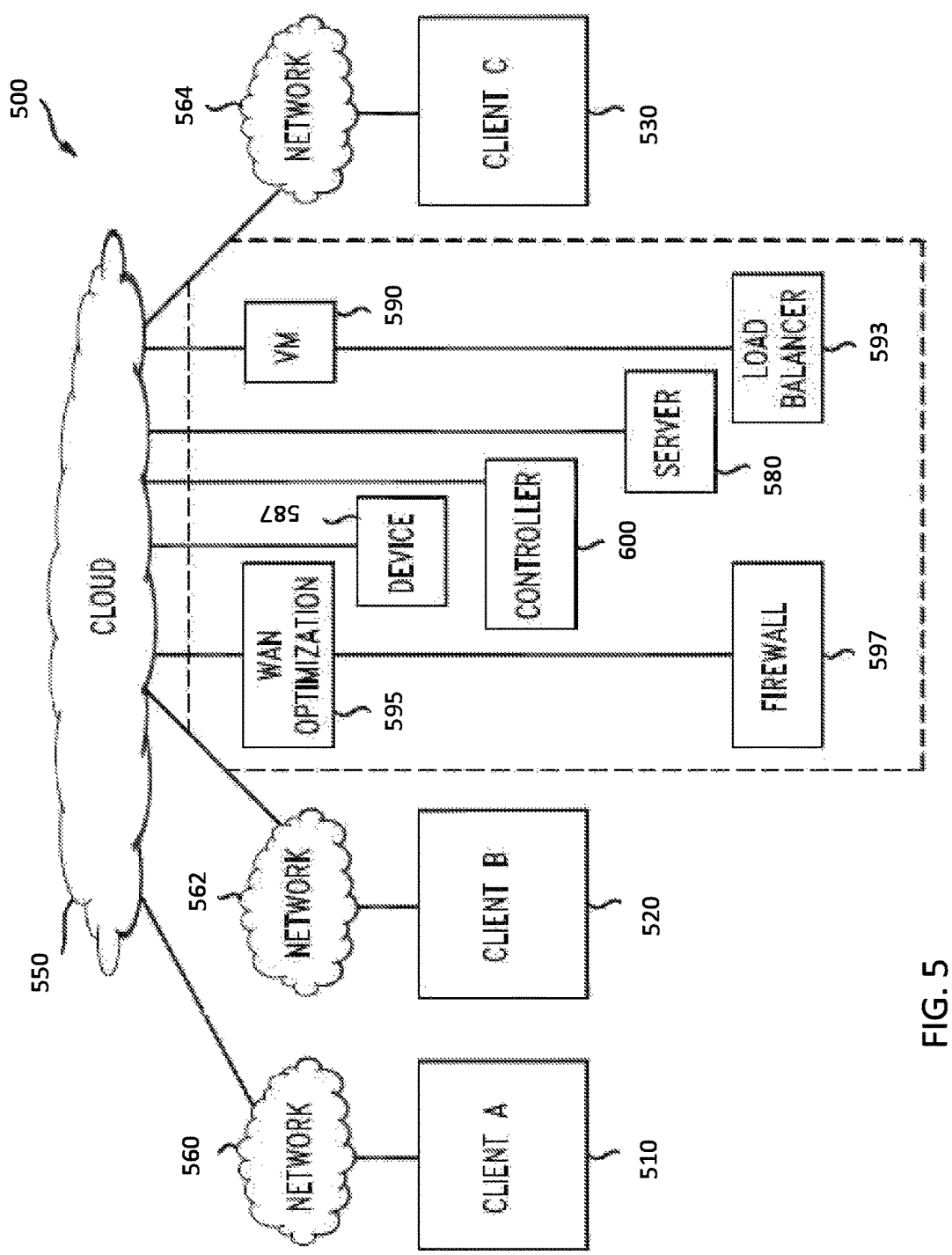
FIG. 5 illustrates a schematic block diagram of an example cloud architecture including nodes/devices interconnected by various methods of communication.

FIG. 5 illustrates a schematic block diagram of an example cloud architecture 500 including nodes/devices interconnected by various methods of communication. Cloud 550 can be a public, private, and/or hybrid cloud system. Cloud 550 can include resources, such as one or more Firewalls 597; Load Balancers 593; WAN optimization platforms 595; devices 587, such as switches, routers, intrusion detection systems, Auto VPN systems, or any hardware or software network device; servers 580, such as dynamic host configuration protocol (DHCP), domain naming system (DNS), or storage servers; virtual machines (VMs) 590; controllers 600, such as a cloud controller or a management device; or any other resource.

Cloud resources can be physical, software, virtual, or any combination thereof. For example, a cloud resource can include a server running one or more VMs or storing one or more databases. Moreover, cloud resources can be provisioned based on requests (e.g., client or tenant requests), schedules, triggers, events, signals, messages, alerts, agreements, necessity, or any other factor. For example, the cloud 550 can provision application services, storage services, management services, monitoring services, configuration services, administration services, backup services, disaster recovery services, bandwidth or performance services, intrusion detection services, VPN services, or any type of services to any device, server, network, client, or tenant.

In addition, cloud 550 can handle traffic and/or provision services. For example, cloud 550 can provide configuration services, such as auto VPN, automated deployments, automated wireless configurations, automated policy implementations, and so forth. In some cases, the cloud 550 can collect data about a client or network and generate configuration settings for specific service, device, or networking deployments. For example, the cloud 550 can generate security policies, subnetting and routing schemes, forwarding schemes, NAT settings, VPN settings, and/or any other type of configurations. The cloud 550 can then push or transmit the necessary data and settings to specific devices or components to manage a specific implementation or deployment. For example, the cloud 550 can generate VPN settings, such as IP mappings, port number, and security information, and send the VPN settings to specific, relevant device(s) or component(s) identified by the cloud 550 or otherwise designated. The relevant device(s) or component(s) can then use the VPN settings to establish a VPN tunnel according to the settings.

To further illustrate, cloud 550 can provide specific services for client A (510), client B (520), and client C (530). For example, cloud 550 can deploy a network or specific network components, configure links or devices, automate services or functions, or provide any other services for client A (510), client B (520), and client C (530). Other non-limiting example services by cloud 550 can include network administration services, network monitoring services, content filtering services, application control, WAN optimization, firewall services, gateway services, storage services, protocol configuration services, wireless deployment services, and so forth.

To this end, client A (510), client B (520), and client C (530) can connect with cloud 550 through networks 560, 562, and 564, respectively. More specifically, client A (510), client B (520), and client C (530) can each connect with cloud 550 through networks 560, 562, and 564, respectively, in order to access resources from cloud 550, communicate with cloud 550, or receive any services from cloud 550. Networks 560, 562, and 564 can each refer to a public network, such as the Internet; a private network, such as a LAN; a combination of networks; or any other network, such as a VPN or an overlay network.

Moreover, client A (510), client B (520), and client C (530) can each include one or more networks. For example, (510), client B (520), and client C (530) can each include one or more LANs and VLANs. In some cases, a client can represent one branch network, such as a LAN, or multiple branch networks, such as multiple remote networks. For example, client A (510) can represent a single LAN network or branch, or multiple branches or networks, such as a branch building or office network in Los Angeles and another branch building or office network in New York. If a client includes multiple branches or networks, the multiple branches or networks can each have a designated connection to the cloud 550. For example, each branch or network can maintain a tunnel to the cloud 550. Alternatively, all branches or networks for a specific client can connect to the cloud 550 via one or more specific branches or networks.

For example, traffic for the different branches or networks of a client can be routed through one or more specific branches or networks. Further, client A (510), client B (520), and client C (530) can each include one or more routers, switches, appliances, client devices, VMs, or any other devices. In some cases, client A (510), client B (520), and/or client C (530) can also maintain links between branches. For example, client A can have two branches, and the branches can maintain a link between each other.

In some cases, branches can maintain a tunnel between each other, such as a VPN tunnel. Moreover, the link or tunnel between branches can be generated and/or maintained by the cloud 550. For example, the cloud 550 can collect network and address settings for each branch and use those settings to establish a tunnel between branches. In some cases, the branches can use a respective tunnel between the respective branch and the cloud 550 to establish the tunnel between branches. For example, branch 1 can communicate with cloud 550 through a tunnel between branch 1 and cloud 550 to obtain the settings for establishing a tunnel between branch 1 and branch 2. Branch 2 can similarly communicate with cloud 550 through a tunnel between branch 2 and cloud 550 to obtain the settings for the tunnel between branch 1 and branch 2.

In some cases, cloud 550 can maintain information about each client network, in order to provide or support specific services for each client, such augmenting feature models with extensions for providing network authorization as further described below in FIGS. 7-9. Cloud 550 can also maintain one or more links or tunnels to client A (510), client B (520), and client C (530). For example, cloud 550 can maintain a VPN tunnel to one or more devices in client A's network. In some cases, cloud 550 can configure the VPN tunnel for a client, maintain the VPN tunnel, or automatically update or establish any link or tunnel to the client or any devices of the client.

The cloud 550 can also monitor device and network health and status information for client A (510), client B (520), and client C (530). To this end, client A (510), client B (520), and client C (530) can synchronize information with cloud 550. Cloud 550 can also manage and deploy services for client A (510), client B (520), and client C (530). For example, cloud 550 can collect network information about client A and generate network and device settings to automatically deploy a service for client A. In addition, cloud 550 can update device, network, and service settings for client A (510), client B (520), and client C (530). For example, cloud 550 can generate authorization extensions for feature models, as further described below.

Those skilled in the art will understand that the cloud architecture 550 can include any number of nodes, devices, links, networks, or components. In fact, embodiments with different numbers and/or types of clients, networks, nodes, cloud components, servers, software components, devices, virtual or physical resources, configurations, topologies, services, appliances, deployments, or network devices are also contemplated herein. Further, cloud 550 can include any number or type of resources, which can be accessed and utilized by clients or tenants. The illustration and examples provided herein are for clarity and simplicity.

Moreover, as far as communications within the cloud architecture 500, packets (e.g., traffic and/or messages) can be exchanged among the various nodes and networks in the cloud architecture 500 using specific network communication protocols. In particular, packets can be exchanged using wired protocols, wireless protocols, or any other protocols. Some non-limiting examples of protocols can include protocols from the Internet Protocol Suite, such as TCP/IP; OSI (Open Systems Interconnection) protocols, such as L1-L7 protocols; routing protocols, such as RIP, IGP, BGP, STP, ARP, OSPF, EIGRP, NAT; or any other protocols or standards, such as HTTP, SSH, SSL, RTP, FTP, SMTP, POP, PPP, NNTP, IMAP, Telnet, SSL, SFTP, WIFI, Bluetooth, VTP, ISL, IEEE 802 standards, L2TP, IPSec, etc. In addition, various hardware and software components or devices can be implemented to facilitate communications both within a network and between networks. For example, switches, hubs, routers, access points (APs), antennas, network interface cards (NICs), modules, cables, firewalls, servers, repeaters, sensors, etc.

Figure 6:
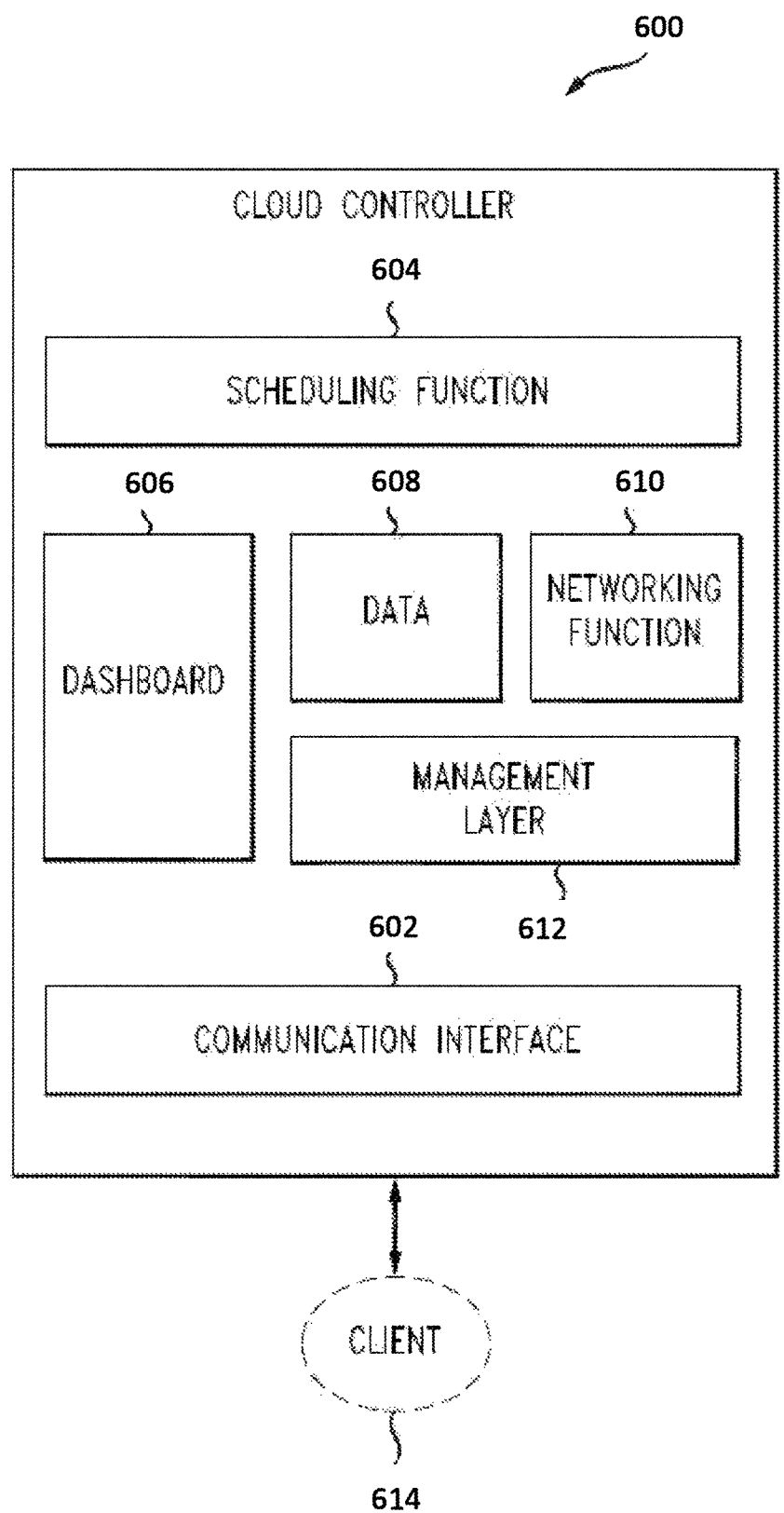
FIG. 6 illustrates a schematic block diagram of an example cloud service management system.

FIG. 6 illustrates a schematic block diagram of an example cloud controller 600. The cloud controller 600 can serve as a cloud service management system for the cloud 550. In particular, the cloud controller 600 can manage cloud operations, client communications, service provisioning, network configuration and monitoring, etc. For example, the cloud controller 600 can manage cloud service provisioning, such as cloud storage, media, streaming, security, or administration services. In some embodiments, the cloud controller 600 can generate authorization extensions for feature models as further described below.

For example, the cloud controller 600 can receive access requests from an access point connected to the network through a switch port via a secure tunnel, determine that the access point is trusted, and negotiate security material with the access point without requiring manual configuration, and instruct the switch port to adopt a trusted PNAC policy for the trusted access point.

The cloud controller 600 can include several subcomponents, such as a scheduling function 604, a dashboard 606, data 608, a networking function 610, a management layer 612, and a communications interface 602. The various subcomponents can be implemented as hardware and/or software components. Moreover, although FIG. 6 illustrates one example configuration of the various components of the cloud controller 600, those of skill in the art will understand that the components can be configured in a number of different ways and can include any other type and number of components. For example, the networking function 610 and management layer 612 can belong to one software module or multiple separate modules. Other modules can be combined or further divided up into more subcomponents.

The scheduling function 604 can manage scheduling of procedures, events, or communications. For example, the scheduling function 604 can schedule when resources should be allocated from the cloud 550. As another example, the scheduling function 604 can schedule when specific instructions or commands should be transmitted to the client 614. In some cases, the scheduling function 604 can provide scheduling for operations performed or executed by the various subcomponents of the cloud controller 600. The scheduling function 604 can also schedule resource slots, virtual machines, bandwidth, device activity, status changes, nodes, updates, etc.

The dashboard 606 can provide a frontend where clients can access or consume cloud services. For example, the dashboard 606 can provide a web-based frontend where clients can configure client devices or networks that are cloud-managed, provide client preferences, specify policies, enter data, upload statistics, configure interactions or operations, etc. In some cases, the dashboard 606 can provide visibility information, such as views of client networks or devices. For example, the dashboard 606 can provide a view of the status or conditions of the client's network, the operations taking place, services, performance, a topology or layout, specific network devices, protocols implemented, running processes, errors, notifications, alerts, network structure, ongoing communications, data analysis, etc.

Indeed, the dashboard 606 can provide a graphical user interface (GUI) for the client 614 to monitor the client network, the devices, statistics, errors, notifications, etc., and even make modifications or setting changes through the GUI. The GUI can depict charts, lists, tables, maps, topologies, symbols, structures, or any graphical object or element. In addition, the GUI can use color, font, shapes, or any other characteristics to depict scores, alerts, or conditions. In some cases, the dashboard 606 can also handle user or client requests. For example, the client 614 can enter a service request through the dashboard 606.

The data 608 can include any data or information, such as management data, statistics, settings, preferences, profile data, logs, notifications, attributes, configuration parameters, client information, network information, and so forth. For example, the cloud controller 600 can collect network statistics from the client 614 and store the statistics as part of the data 608. In some cases, the data 608 can include performance and/or configuration information. This way, the cloud controller 600 can use the data 608 to perform management or service operations for the client 614. The data 608 can be stored on a storage or memory device on the cloud controller 600, a separate storage device connected to the cloud controller 600, or a remote storage device in communication with the cloud controller 600.

The networking function 610 can perform networking calculations, such as network addressing, or networking service or operations, such as auto VPN configuration or traffic routing. For example, the networking function 610 can perform filtering functions, switching functions, automatic link security functions, network or device deployment functions, resource allocation functions, messaging functions, traffic analysis functions, port configuration functions, mapping functions, packet manipulation functions, path calculation functions, loop detection, cost calculation, error detection, or otherwise manipulate data or networking devices. In some embodiments, the networking function 610 can handle networking requests from other networks or devices and establish links between devices. In other embodiments, the networking function 610 can perform queueing, messaging, or protocol operations.

The management layer 612 can include logic to perform management operations. For example, the management layer 612 can include the logic to allow the various components of the cloud controller 600 to interface and work together. The management layer 612 can also include the logic, functions, software, and procedure to allow the cloud controller 600 perform monitoring, management, control, and administration operations of other devices, the cloud 550, the client 614, applications in the cloud 550, services provided to the client 614, or any other component or procedure. The management layer 612 can include the logic to operate the cloud controller 600 and perform particular services configured on the cloud controller 600.

Moreover, the management layer 612 can initiate, enable, or launch other instances in the cloud controller 600 and/or the cloud 550. In some embodiments, the management layer 612 can also provide authorization and security services for the cloud 550, the client 614, the controller 614, and/or any other device or component. Further, the management layer 612 can manage nodes, resources, VMs, settings, policies, protocols, communications, etc. In some embodiments, the management layer 612 and the networking function 610 can be part of the same module. However, in other embodiments, the management layer 612 and networking function 610 can be separate layers and/or modules. The communications interface 602 allows the cloud controller 600 to communicate with the client 614, as well as any other device or network. The communications interface 602 can be a network interface card (NIC), and can include wired and/or wireless capabilities. The communications interface 602 allows the cloud controller 600 to send and receive data from other devices and networks. In some embodiments, the cloud controller 600 can automatically negotiate of link security for nodes in a cloud network, as described in more detail below.

Having disclosed a brief introductory description of exemplary systems and networks, the discussion now turns to automatically generating and deploying extensions for network features. As explained above, network features such as software modules, firmware features for new hardware, virtual machines, etc. are routinely added, modified, updated, etc. The operational parameters and the configuration of the network features can be modeled using a variety of modeling techniques, such as the YANG modeling language for the standardized Network Configuration Protocol (NETCONF). As explained above, removal of parameters from a feature model is oftentimes not permitted which forces operators to understand complex authorization policies, constantly monitor a policy engine, and alter the enforcement policies every time a change to a feature model is detected. The present technology addresses a need for a system of automatically, dynamically generating data model extensions to enforce access restrictions.

The disclosed technology can involve a model-driven approach that enhances software-defined network controllers to automate the task of adding authorization policy and other policy settings to any feature defined in a modeling language, such as the YANG model. For example, a characteristic of the YANG language is the possibility to extend the model by means of model augmentations and provide additional parameters over those present in standard feature models. The disclosed technology uses this characteristic, and in essence constructs a dynamic augmentation of the feature model with added data nodes.

Examples of dynamic augmentation of a feature model described herein refer specifically to authorization policies, authorization policy engines, authorization model generators, etc. However, the disclosed systems, methods, and computer-readable media for dynamic augmentation of feature models can also be extended to a wide range of network features. For example, the authorization policy can also extend a variety of access policies relating to dynamic augmentation for any system wide behavior recognized by the controller (e.g. accounting, logging, etc.). Additionally, a wide variety of other network features can be augmented based on a wide variety of other policies and based on network feature deployment context and environments (e.g. time, location, connection method, etc.) Those with ordinary skill in the art having the benefit of the present disclosure will readily appreciate that dynamic augmentation of feature models can be applied a wide variety of network features and can be based on a wide variety of policies and network contexts.

Typically, a client running a software-defined network controller (eg, OpenDaylight) can deploy new network features, such as services or devices that are controlled by the controller. The new network features can contain configurable features with parameters that also become controllable by the network controller. In some cases, the features and their parameters are acquired by a controller upon the feature's YANG data model being loaded into the controller from a device.

Some embodiments of the present technology involve an authorization model generator integrated within or communicatively coupled with a cloud controller in a software-defined network. The authorization model generator can process new feature models and changes to existing feature model to dynamically augment the data models of the new or modified features with extensions for adding authorization policy nodes to the data models and thereby enforcing restrictions to the features. The authorization model generator can apply basic rules and heuristics when augmenting a feature model, it can also apply rule-based analytics (e.g. based on a client profile, business intelligence, collected client data, etc.), or combinations thereof.

Figure 7:
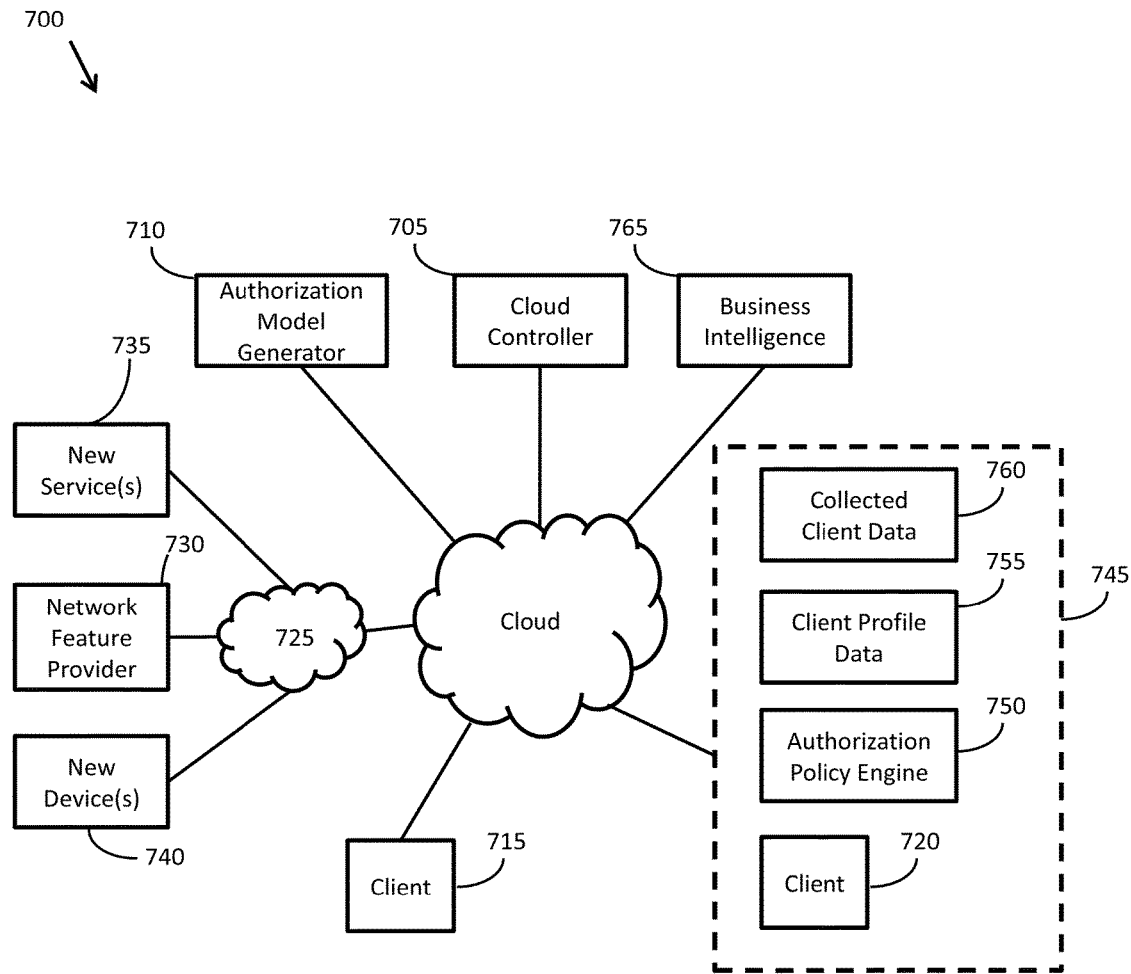
FIG. 7 illustrates a schematic block diagram of cloud architecture including an authorization model generator.

FIG. 7 illustrates a schematic block diagram of cloud architecture 700 including an authorization model generator 710. The cloud architecture 700 includes cloud controller 705 that manages network resources and services 725 for clients 715, 720. The network resources and services 725 available in the cloud architecture 700 can be expanded, scaled, updated, modified, restricted, etc. In some cases, a network feature provider 730 can provide new services 735 and/or new devices (with corresponding firmware) 740. These new network resources can be defined as feature models in a data modeling language, such as YANG. Although the YANG modeling language is used herein in connection with the automated, dynamic generation of data model extensions, those with ordinary skill in the art having the benefit of the disclosure will readily appreciate that the disclosed technology can benefit a wide variety of data modeling approaches.

The controller 705, upon detecting the availability of such a new feature, instead of waiting for operator's manual configuration, can automatically request default configuration authorization settings from a repository. For example, this can be done by passing in the feature's YANG module information (e.g. name, date, etc.) to an authorization model generator 710 to which the controller has authorized access to. When the network feature provider 730 provides network features described by a feature model, the authorization model generator 710 can process the feature model based on an authorization policy to define access rules control rules for the new network feature. Also, the authorization model generator 710 can generate, based on the access control rules, a set of augmentation statements for one or more data nodes in the feature model of the new network feature.

The authorization model generator 710 can generate the augmentation statements differently for various network clients. In some cases, the authorization model generator 710 can define the access control rules based on a default set of rules and heuristics for enforcing access control for a generic client 715. For example, based on the network configuration, the system can determine that the network is a Service Provider (SP) network and it downloads feature default settings applicable to an SP.

In some cases, a client 720 can be a client within an organization, such as an enterprise 745. In some cases, an enterprise 745 can manage its own enterprise authorization policy engine 750 and the authorization model generator 710 can communicate with the enterprise authorization policy engine 750 when generating augmentation statements for adding access control nodes into a feature model. Also, an enterprise 745 can include client profile data 755 and other collected client data 760 that can be used by the enterprise authorization policy engine and/or the authorization model generator 710 generating augmentation statements for adding access control nodes into a feature model. Similarly, the authorization model generator 710 can use gathered business intelligence 765 to generate augmentation statements for clients 715, 720.

After the authorization model generator 710 generates augmentation statements, the authorization model generator 710 can process the feature model (e.g. line-by-line for a textual data modeling language) and augment the feature model with extensions according to the augmentation statements. Likewise, the authorization model generator 710 and/or the cloud controller can deploy the augmented feature models.

Figure 8:
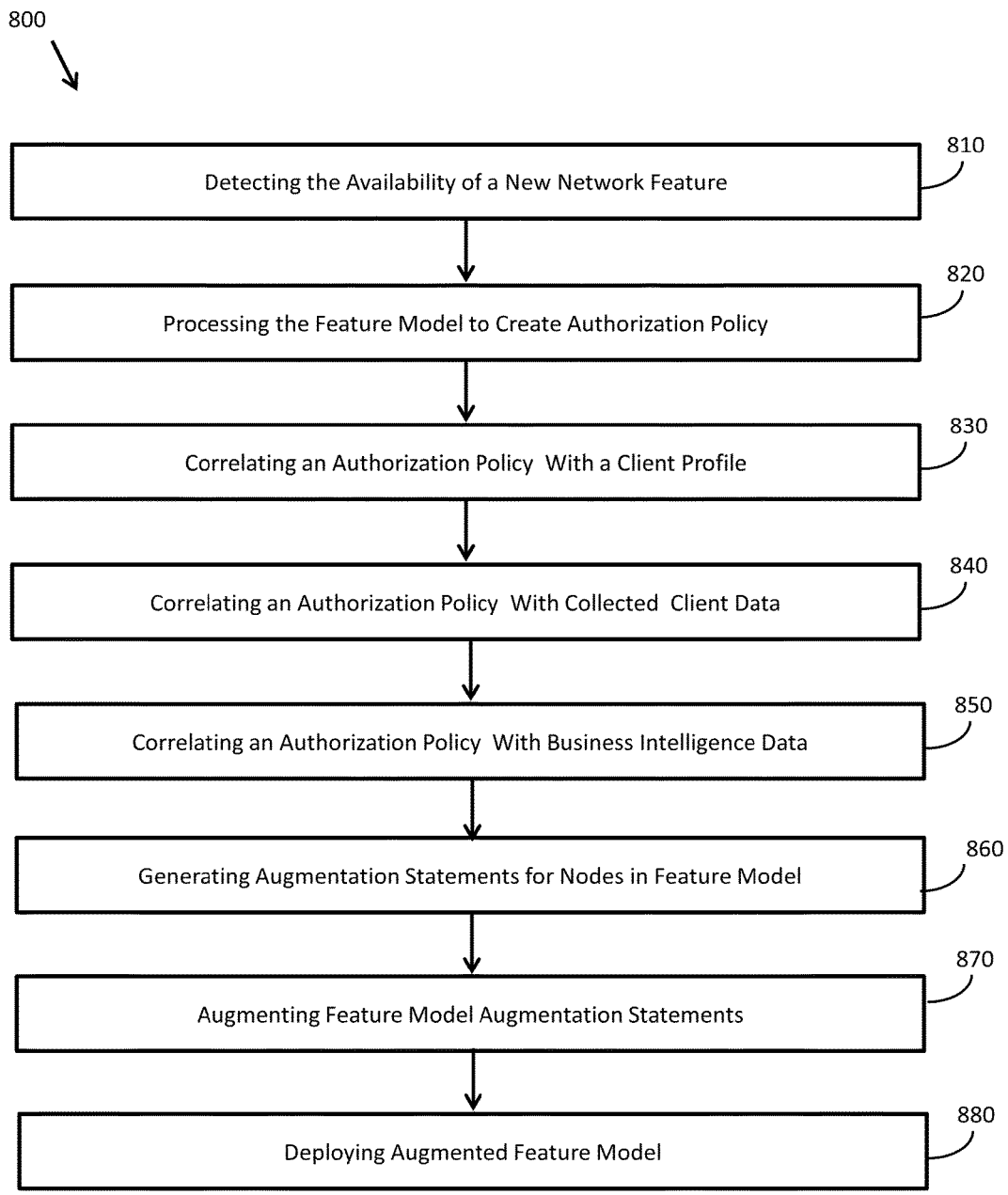
FIG. 8 illustrates n example method of augmenting a feature model of a network feature with model extensions for enforcing authorization controls.

FIG. 8 illustrates n example method 800 of augmenting a feature model of a network feature with model extensions for enforcing authorization controls. First, the method 800 involves detecting the availability of a new network feature 810. As explained above, new network features are commonly defined by a feature model in a data modeling language such as YANG. In some cases, detection of network features involves detection of newly introduced network services or devices, such as new software, firmware, etc. In some cases, detection of new network features involves detection of newly modified features of existing services or devices. Also, detection of new network features can be performed by one or more network entity including a cloud controller, an authorization model generator, an authorization policy engine, etc.

The method 800 also involves one or more network entity processing a feature model 820 of the detected network feature to create authorization policy data defining access rules control rules for the new network feature. In some cases, processing the feature model comprises applying one or more rules and heuristics to each data node in the feature model. Also, creating authorization policy data can involve correlating the authorization policy with other system data. For example, as shown in FIG. 8, the method 800 further involves correlating the authorization policy with a client profile 830, correlating the authorization policy with a set of collected client data 840, and correlating the authorization policy with a collection of business intelligence data 850.

Next, based on the correlated authorization policy, the method 800 involves generating a set of augmentation statements for one or more data nodes in the feature model of the new network feature 860 and augmenting the new feature model with the augmentation statements 870. The method 800 also involves deploying the augmented feature model for the new network features 880.

An example of dynamically augmenting a feature model can involve a Quality-of Service (QoS) feature modelled by a YANG model. For this QoS feature model, an enterprise's authorization policy may consist following rules: 1. Enabling/disabling the QoS feature can be performed by regular operators of the controller; and 2. Modification of the QoS feature parameters can only be performed by authorized users. For another organization, the authorization policy for the same QoS feature may consist following rules: 1. Enabling/disabling the QoS feature can be performed by regular operators of the controller; 2. Modification of QoS feature parameters can be performed by regular operators of the controller.

Figure 9:
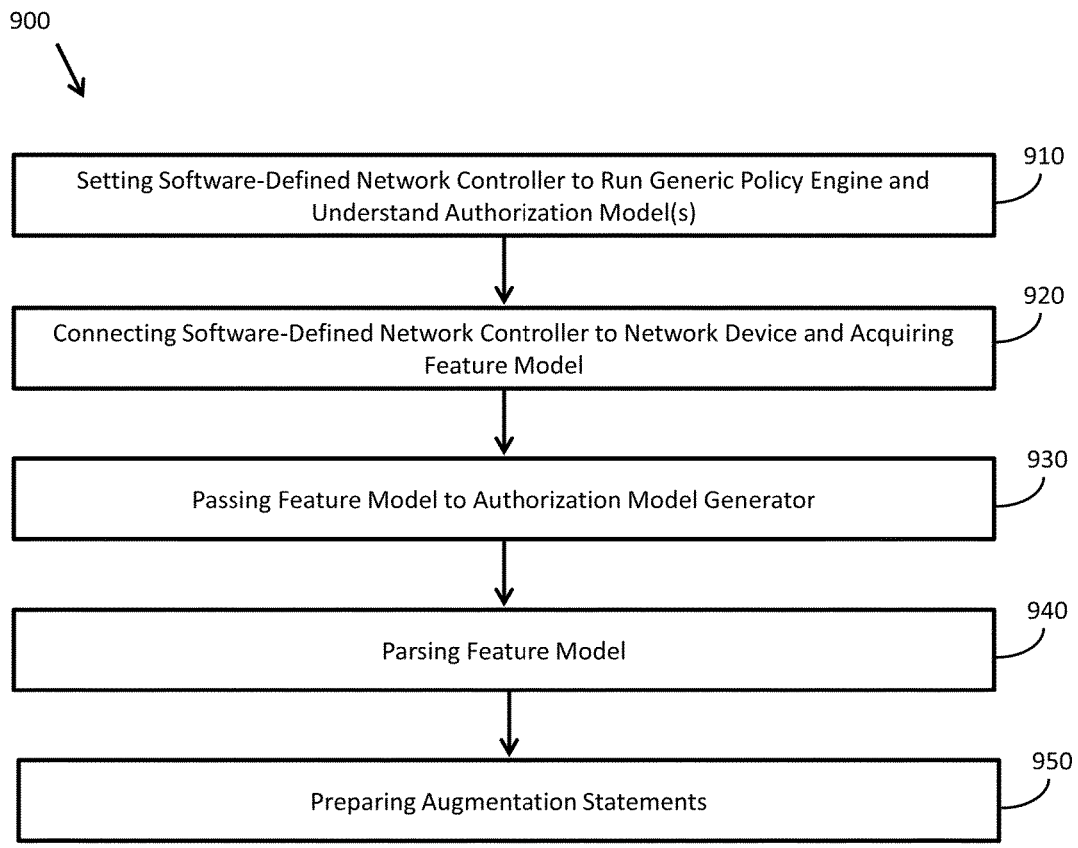
FIG. 9 illustrates a method of a policy engine providing permission to modify parameters of a feature model according to the above example.

FIG. 9 illustrates a method 900 of a policy engine providing permission to modify parameters of a feature model according to the above example. First, the software-defined network controller is set up to run the generic policy engine and understand the authorization model 910. Next, the software-defined network controller connects to the network device and acquires the feature model 920 and the software-defined network controller passes the feature model to the authorization model generator 930.

Next, the method 900 involves the authorization model generator parsing the feature model 940 and preparing augmentation statements for each of the feature model data nodes 950 where the augmentation statements add the authorization node.

It should be understood that there can be additional, fewer, or alternative steps performed in similar or alternative orders, or in parallel, within the scope of the various embodiments unless otherwise stated.

As one of ordinary skill in the art will readily recognize, the examples and technologies provided above are simply for clarity and explanation purposes, and can include many additional concepts and variations.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

For clarity of explanation, in some instances the present technology may be presented as including individual functional blocks including functional blocks comprising devices, device components, steps or routines in a method embodied in software, or combinations of hardware and software.

Note that in certain example implementations, the optimization and/or placement functions outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor, or other similar machine, etc.). The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
   detecting, in a cloud-based network, an availability of a new network feature defined by a feature model in a data modeling language;
   automatically requesting, upon detection of the availability of the new network feature, authorization data;
   processing the feature model using the authorization data to create a policy defining rules for the new network feature;
   generating, based on the policy, a set of augmentation statements for one or more data nodes in the feature model of the new network feature;
   augmenting the feature model with the set of augmentation statements to yield an augmented feature model; and
   deploying the augmented feature model with the set of augmentation statements to enforce the policy for the new network feature.

2. The computer-implemented method of claim 1, wherein the data modeling language includes a YANG modeling language.

3. The computer-implemented method of claim 1, wherein the new network feature is one or more of a new software service and a new network device.

4. The computer-implemented method of claim 1, wherein the processing of the feature model includes applying one or more rules and heuristics to each of the one or more data nodes in the feature model.

5. The computer-implemented method of claim 1, further comprising:
   correlating the policy with a client profile; and
   wherein set of augmentation statements generated based on rule-based access controls described in the client profile.

6. The computer-implemented method of claim 1, further comprising:
   correlating the policy with a set of collected client data; and
   generating one or more rules from the set of collected client data, wherein generating the set of augmentation statements for one or more data nodes in the feature model of the new network feature is further based on the one or more rules generated from the set of collected client data.

7. The computer-implemented method of claim 1, further comprising:
   correlating the policy with a collection of business intelligence data; and
   generating one or more rules from the collection of business intelligence data,
   wherein the set of augmentation statements is generated based on the one or more rules.

8. The computer-implemented method of claim 1, wherein the detecting of the availability of the new network feature and the deploying of the augmented feature model are performed by a cloud-based network controller.

9. The computer-implemented method of claim 8, wherein the processing of the feature model, the generating of the set of augmentation statements, and the augmenting of the feature model are performed by an authorization augmentation engine in communication with the cloud-based network controller.

10. The computer-implemented method of claim 8, wherein the processing of the feature model, the generating of the set of augmentation statements, and the augmenting of the feature model are performed by an authorization augmentation engine integral to the cloud-based network controller.

11. A cloud controller on a network, the cloud controller comprising:
 a processor; and
 a computer-readable storage medium having stored therein instructions which, when executed by the processor, cause the processor to perform operations comprising:
  detecting, in a cloud-based network, an availability of a new network feature defined by a feature model in a data modeling language;
  automatically requesting, upon detection of the availability of the new network feature, authorization data;
  processing the feature model using the authorization data to create a policy defining rules for the new network feature;
  generating, based on the policy, a set of augmentation statements for one or more data nodes in the feature model of the new network feature;
  augmenting the feature model with the set of augmentation statements to yield an augmented feature model; and
  deploying the augmented feature model with the set of augmentation statements to enforce the policy for the new network feature.

12. The cloud controller of claim 11, wherein the processing of the feature model includes applying one or more rules and heuristics to each of the one or more data nodes in the feature model.

13. The cloud controller of claim 11, wherein the instructions further cause the processor to perform operations comprising:
 correlating the policy with a client profile,
 wherein the generating of the set of augmentation statements is based on rule-based access controls described in the client profile.

14. The cloud controller of claim 11, wherein the instructions further cause the processor to perform operations comprising:
 correlating the policy with a client profile;
 correlating the policy with a set of collected client data;
 generating one or more rules from the set of collected client data;
 correlating the policy with a collection of business intelligence data; and
 generating one or more rules from the collection of business intelligence data,
 wherein the set of augmentation statements is generated based on the one or more rules generated from the set of collected client data and the one or more rules generated from the collection of business intelligence data.

15. A non-transitory computer-readable storage medium having stored therein instructions which, when executed by a processor in a cloud controller associated with a network, cause the processor to perform operations comprising:
 detecting, in a cloud-based network, an availability of a new network feature defined by a feature model in a data modeling language;
 automatically requesting, upon detection of the availability of the new network feature, authorization data;
 processing the feature model using the authorization data to create a policy defining access control rules for the new network feature;
 generating, based on the policy, a set of augmentation statements for one or more data nodes in the feature model of the new network feature;
 augmenting the feature model with the set of augmentation statements to yield an augmented feature model; and
 deploying the augmented feature model with the set of augmentation statements to control access to the new network feature.

16. The non-transitory computer-readable storage medium of claim 15, wherein the data modeling language includes a YANG modeling language.

17. The non-transitory computer-readable storage medium of claim 15, wherein the processing of the feature model includes applying one or more rules and heuristics to each of the one or more data nodes in the feature model.

18. The non-transitory computer-readable storage medium of claim 15, wherein the instructions further cause the processor to perform operations comprising:
 correlating the policy with a client profile,
 wherein the generating of the set of augmentation statements is based on rule-based access controls described in the client profile.

19. The non-transitory computer-readable storage medium of claim 15, wherein the instructions further cause the processor to perform operations comprising:
 correlating the policy with a set of collected client data; and
 generating one or more rules from the set of collected client data,
 wherein the set of augmentation statements is generated based on the one or more rules.

20. The non-transitory computer-readable storage medium of claim 15, wherein the instructions further cause the processor to perform operations comprising:
 correlating the access control rules with a collection of business intelligence data; and
 generating one or more rules from the collection of business intelligence data,
 wherein the set of augmentation statements is generated based on the one or more rules.

\* \* \* \* \*